US006304972B1

(12) United States Patent
Shavit

(10) Patent No.: US 6,304,972 B1
(45) Date of Patent: Oct. 16, 2001

(54) SECURE SOFTWARE SYSTEM AND RELATED TECHNIQUES

(75) Inventor: Nir N. Shavit, Cambridge, MA (US)

(73) Assignee: Massachusetts Institute of Technology

( * ) Notice: Subject to any disclaimer, the term of this patent is extended or adjusted under 35 U.S.C. 154(b) by 0 days.

(21) Appl. No.: 09/476,557

(22) Filed: Jan. 3, 2000

(51) Int. Cl.[7] .................................................. G06F 11/00
(52) U.S. Cl. .............................................. 713/200; 380/25
(58) Field of Search ................................... 713/200, 201, 713/202; 380/4, 25, 23; 714/4, 18, 25, 37, 43, 48; 370/241, 252; 340/825.34, 825.31

(56) References Cited

U.S. PATENT DOCUMENTS

| 4,652,990 | * | 3/1987 | Pailen et al. | 364/200 |
|---|---|---|---|---|
| 4,864,494 | * | 9/1989 | Kobus, Jr. | 364/200 |
| 5,023,907 | | 6/1991 | Johnson et al. | 380/4 |
| 5,109,413 | | 4/1992 | Comerford et al. | 380/4 |
| 5,222,134 | | 6/1993 | Waite et al. | 380/4 |
| 5,234,045 | | 8/1993 | Cisko | 164/97 |
| 5,327,563 | | 7/1994 | Singh | 380/4 |
| 5,495,411 | | 2/1996 | Ananda | 364/401 |
| 5,530,752 | * | 6/1996 | Rubin | 380/4 |
| 5,548,645 | * | 8/1996 | Ananda | 380/4 |
| 5,557,346 | | 9/1996 | Lipner et al. | 380/21 |
| 5,675,645 | | 10/1997 | Schwartz et al. | 380/4 |
| 5,689,560 | * | 11/1997 | Cooper et al. | 380/4 |
| 5,699,512 | * | 12/1997 | Moriyasu et al. | 395/186 |
| 5,708,709 | * | 1/1998 | Rose | 380/4 |
| 5,745,879 | * | 4/1998 | Wyman | 705/1 |
| 5,754,646 | * | 5/1998 | William et al. | 380/4 |
| 5,870,467 | * | 2/1999 | Imai et al. | 380/4 |
| 5,940,516 | * | 8/1999 | Mason et al. | 380/49 |
| 5,982,892 | * | 11/1999 | Hicks et al. | 380/4 |

* cited by examiner

Primary Examiner—Nadeem Iqbal
(74) Attorney, Agent, or Firm—Daly, Crowley & Mofford, LLP

(57) ABSTRACT

A secure software system includes a transformation processor for transforming an original program capable of being executed on a lessee site into a vendor server program, a first program intended to be executed at the lessee site which lacks some of the functionality of the original program and a second program. The first program provides some of the computation of the original program but is unable to provide all of the functionality of the Original Program and requires cooperation with the second program which corresponds to an excised portion of the original program to provide the functionality of original program. The excised program is executed or otherwise utilized by a vendor server program which, in one embodiment, is generated by the transformation processor. With this arrangement, the lessee obtains the total functionality of the original program without having access to the original program code and the excised program is selected such that it would be relatively difficult to recreate the total functionality of the original program.

27 Claims, 7 Drawing Sheets

SECURE SOFTWARE SYSTEM AND RELATED TECHNIQUES

CROSS REFERENCE TO RELATED APPLICATIONS

Not applicable.

STATEMENT REGARDING FEDERALLY SPONSORED RESEARCH

Not applicable.

BACKGROUND OF THE INVENTION

As is known in the art, there is a trend to couple computers including personal computers (PCs) to computer networks such as the internet, for example. There is also a trend for software providers or vendors to deliver software to software users over computer networks. The ease of transporting software over networks makes illegal or otherwise unauthorized copying, use, and distribution of computer code relatively easy.

While a variety of different techniques exist for protecting software against unlawful copying, use and distribution, those systems which are considered relatively secure include specialized hardware attached to or embedded in a processor of a computer executing the software. Such specialized hardware can be customized to operate with a specific software program or can be implemented in a general manner to operate with any software program executed by the processing system which executes the software and includes the specialized hardware. One system which employs such a hardware approach to securing software is described in U.S. Pat. No. 5,234,045 entitled Comprehensive Software Protection System issued to Goldriech, et al. This patent describes a system which includes hardware to execute encrypted portions of computer code in a way that prevents the encrypted portions from being revealed.

Unfortunately, it is possible to reverse engineer such specialized hardware, thereby allowing an unauthorized third party to decode the missing parts of the computer code. Moreover, once a third party has decoded the computer code, the unauthorized user can pose as a legal vendor of the computer code by encrypting the unauthorized version of the software using the accepted hardware based protection standard. The unauthorized user can then distribute the software. Furthermore, it is relatively difficult to detect such unauthorized use and copying, since to demonstrate that computer code is an illegal copy, one would have to decrypt the missing parts of the computer code.

Given the current rate of progress in assuring reliability and availability of communication over computer networks, it will soon become effective and acceptable to rely on a network to guarantee fast response time to messages sent over the network to a specialized server site. It would, therefore, be desirable to provide a technique for securely distributing over a network software executable on a client processing system but which cannot be easily copied for unauthorized use.

SUMMARY OF THE INVENTION

In accordance with the present invention, a processing system includes a code extraction processor to receive an original software program and to parse the original software program to provide a first program and a second program, a first storage device having the first program stored therein, a second storage device having stored therein a server program which utilizes the second program and an execution processor coupled to the first and second storage devices to execute the server program and the second program. With this particular arrangement, a processing system for use in a secure software system is provided.

The code extraction processor operates on the original program and extracts at least a portion of the original program. The remaining portions of the original program correspond to the first program which is intended to be transmitted to a client or lessee site over a network. The lessee site includes a processing system appropriate for executing the first program. The second program includes the excised portion of the original program code.

In a preferred embodiment, the excised program portion corresponds to a relatively small portion of the original program and, taken alone, does not constitute an executable computer program. Rather, the excised program portion is utilized by a server program which provides communication and responses to queries provided thereto by the first program executing at the lessee site. The first program transmitted to the lessee site for execution includes substantially all of the original program.

In one particular embodiment, the code extraction processor generates a plurality of different first programs each intended to be transmitted to a different lessee site and a corresponding plurality of excised program portions. A server program executes or otherwise utilizes a particular excised code portion associated with a particular first program executing at a lessee site. In a preferred embodiment, the code extraction processor concurrently generates the first and second programs as well as one or more server programs which cooperate with respective ones of the second programs. Preferably, the second program includes one or more portions of the original program selected to render it difficult to recreate the functionality of the original program from information stored at or otherwise available at the lessee site.

It is economically viable and in many cases preferable for a software vendor to lease rather than sell software to interested parties, as can be achieved with the present invention. This gives both the software vendor and the software customer more flexibility since the customer can elect to pay for the software on a per-use basis thereby avoiding the need to purchase a new copy of the software in the event the software is updated. Moreover, the software user can retrieve the latest version of the software from the software vendor over a network. For the vendor, leasing the software provides an opportunity to market the software to software users who would not otherwise purchase a particular software program. Moreover, the software vendor can advertise the software program relatively easily by allowing users to lease the software without fee or at a reduced fee for limited time periods, charging fees only after the customer has become accustomed to the software. Furthermore, the vendor can maintain control over those parties able to use the software. Given the growing concern over limiting access to software that may be rated as adult material, the system of the present invention allows the vendor to control distribution and thus prevent possible liability without requiring a software user to purchase or include specialized hardware in the user's processing system.

In accordance with a further aspect of the present invention, a method for securing a computer program to be distributed over a network includes the steps of providing an original program, identifying selected inputs to the original program and extracting program code portions from the original program in response to the selected inputs to provide a first program to be transmitted and executed at a lessee site. The method further includes the steps of including the excised code portions in a second program, storing the second program in a storage device located at a vendor site and providing a server program which executes on a processor at the vendor site, wherein the server program utilizes the second program and the vendor site includes a communication mechanism between the first and second programs. With this particular technique, a method of generating a secure computer program is provided. In a preferred embodiment, the program code portions extracted from the original program to provide the second program correspond to one or more portions of the program code which represent a relatively small percentage of the total functionality of the original program but which are necessary for complete execution of the first program. The first program may be transmitted to a lessee site and executed on a lessee's computer. However, the first program executed at the lessee site does not include all of the functionality of the original program and thus, requires one or more inputs transmitted thereto over the network from the vendor site. Such inputs are provided by the cooperative execution of the vendor server program and the second program.

BRIEF DESCRIPTION OF THE DRAWINGS

The foregoing features of this invention, as well as the invention itself, may be more fully understood from the following detailed description of the drawings in which:

FIG. 3A is a block diagram illustrating operation of the secure software system of FIG. 3.

DETAILED DESCRIPTION OF THE INVENTION

Figure 1:
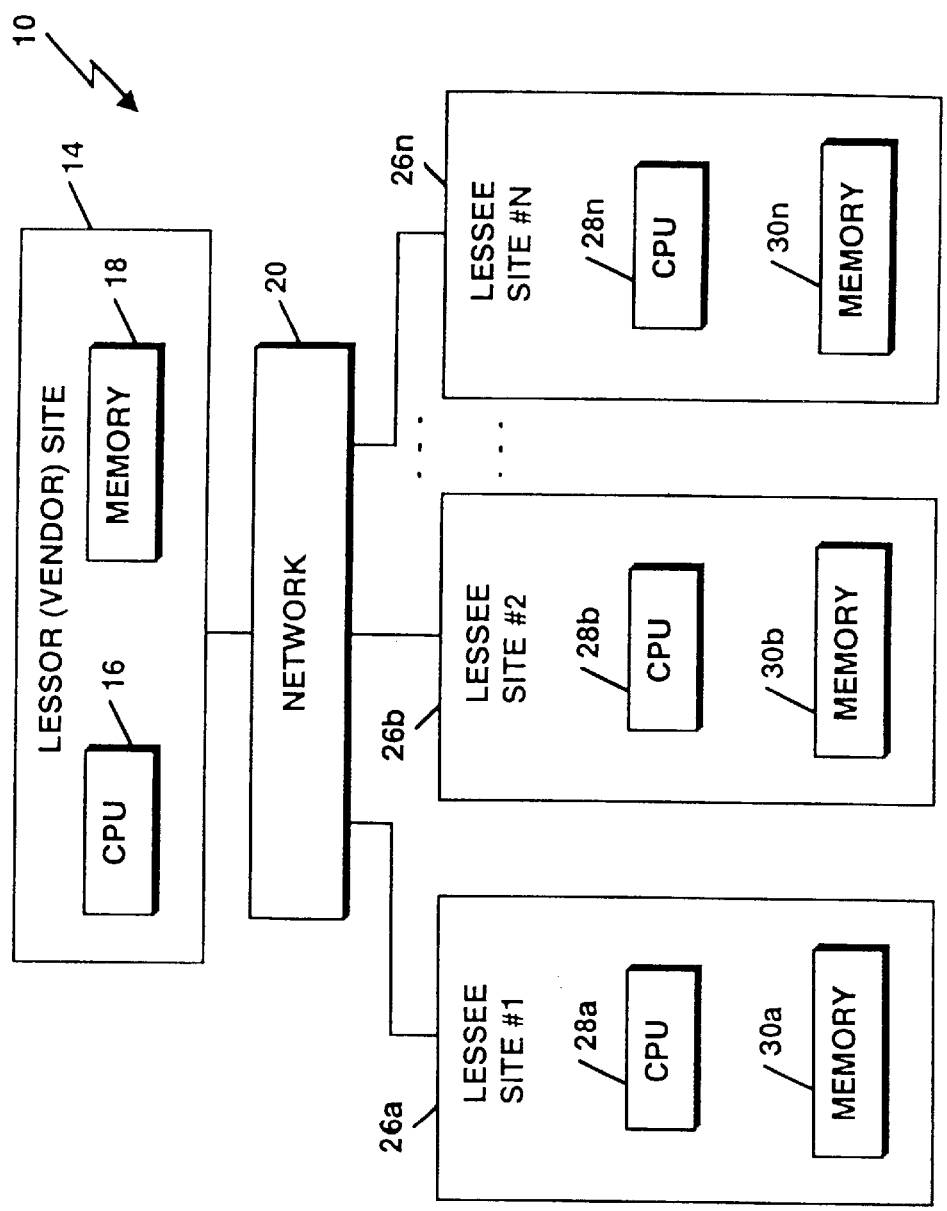
FIG. 1 illustrates a computer architecture on which the secure software system of the present invention operates.

Referring to FIG. 1, a block diagram of an illustrative computer architecture 10 on which the secure software system of the present invention operates is shown. A lessor, or vendor site 14, including a central processor unit (CPU) 16 and a memory 18, is coupled to a communication path, or network 20. For simplicity and ease of explanation, a single CPU is here shown. It will be appreciated by those of ordinary skill in the art, however, that the CPU 16 can comprise a single CPU or multiple individual CPUs operating independently or in communication. Such communication may in some embodiments occur over a local bus while in other embodiments such communication between multiple CPUs 16 may occur over a vendor network (not shown). Further, the network 20 may be of various physical forms, such as a local area network or a wide area network, and implement any conventional communication protocol. In one embodiment, the network 20 represents the internet.

A plurality of lessee sites 26a, 26b, . . . 26n are coupled to the network 20 and seek authorized use of a computer program, referred to herein as the Original Program $\pi$, residing at the vendor site 14. Each of the lessee sites 26a–26n includes a CPU 28a–28n and a memory 30a–30n, respectfully, as shown. It will be appreciated that the lessee CPU 28a–28n may comprise one or multiple CPUs operating independently or in communication over a local bus or a lessee network (not shown).

The Original Program $\pi$ can be characterized as a "stand-alone" program in that it is capable of being executed at one or more lessee sites 26a–26n, regardless of whether the program communicates with the vendor site or any other site. Typically, the Original Program $\pi$ is an application program, such as a word processing program, a spreadsheet program or a graphics program. In this regard, the vendor site 14 can be considered to be a "server", with the lessee sites 26a–26n, or even the individual users of the lessee sites 26a–26n, being its "clients". Preferably, the Original Program $\pi$ requires external data to be input and/or execution of the Original Program $\pi$ requires data from a previous execution (i.e., requires data to be "re-used").

In accordance with the invention, the Original Program $\pi$ residing at the vendor site 14 is "leased" or provided to one or more of the lessee sites 26a–26n for use in a way that prevents unauthorized use and/or copying of the Original Program. As will become apparent, the "lease" can be further "narrowed" to one or more individual users of a lessee site. For example, the authorized lessee site may represent a Management Information System (MIS) department of a company or specific company employees and the present invention permits a vendor to control use by all lessees. The "lease" is achieved by providing one or more lessees with a Local Program $\hat{\pi}_1$ to be executed at the lessee site 26a–26n. The Local Program $\hat{\pi}_1$ provides some of the computation of the Original Program $\pi$ but is unable to provide all of the functionality of the Original Program $\pi$ and requires cooperation with a Program $\hat{\pi}_2$ which corresponds to an excised portion of the Original Program $\pi$ to provide the functionality of Original Program $\pi$. Excised Program Portion $\hat{\pi}_2$ is executed or otherwise utilized by a Vendor Server Program A executed on a processor at the vendor site 14, as will be described.

With this arrangement, the lessee obtains the total functionality of the Original Program $\pi$ without having access to the Original Program code, thereby preventing any unauthorized use of the Original Program. Furthermore, the Excised Program Portion $\hat{\pi}_2$ is selected such that it would be relatively difficult to recreate the total functionality of the Original Program $\pi$. Thus, an operator or user of the Local Program $\hat{\pi}_1$ at a lessee site would be unable to provide the missing functionality without a relatively large expenditure of time, money and/or processing resources.

Figure 2:
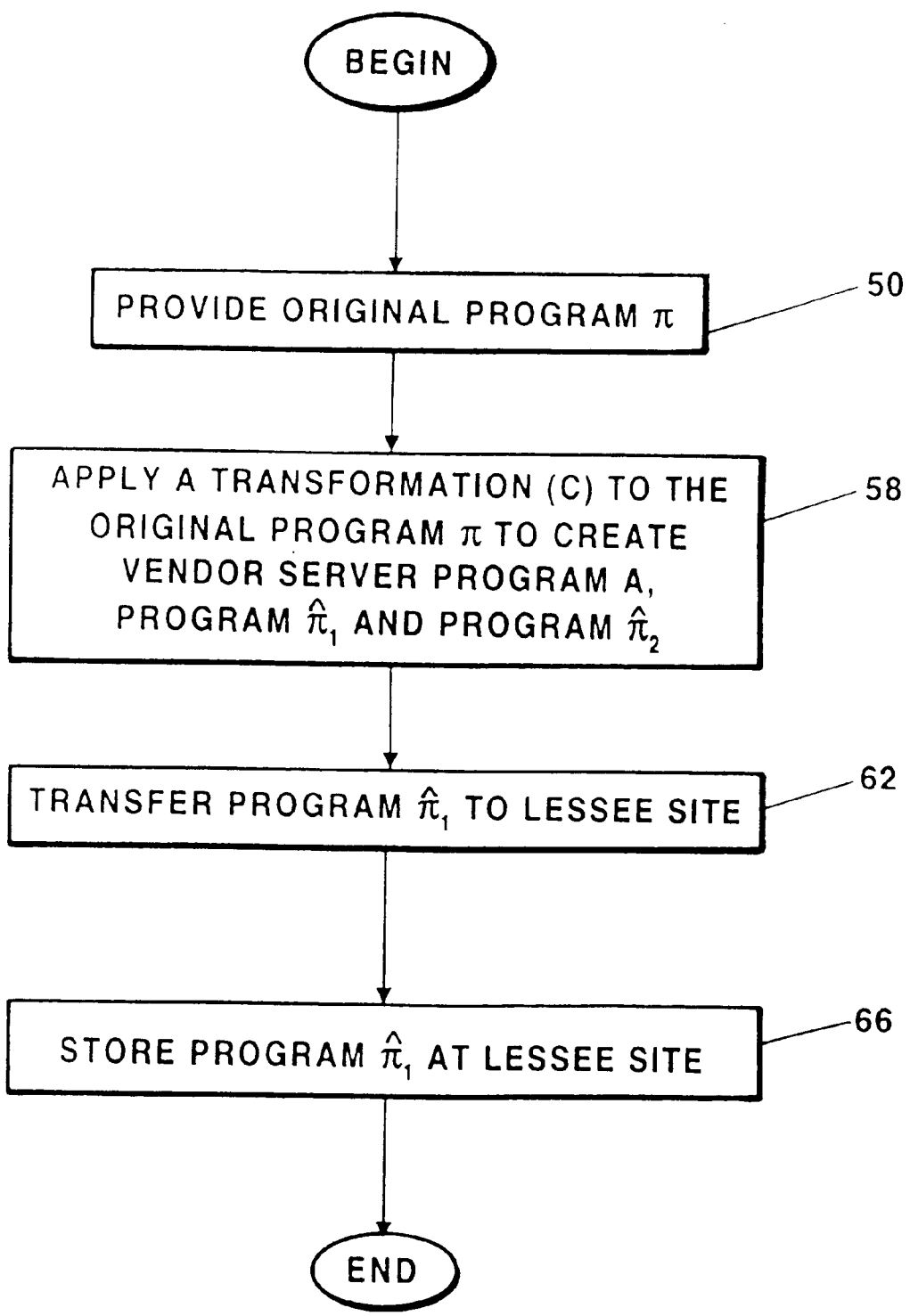
FIG. 2 is a flow diagram illustrating a method for providing a secure software system in accordance with the invention.

Referring also to FIG. 2, a process for generating the secure software system is shown. It will be appreciated by those of ordinary skill in the art that the particular sequence of steps described is illustrative only and can be varied without departing from the spirit of the invention. Processing begins in step 50, with the Original Program $\pi$ being provided. Recall that the Original Program $\pi$ is capable of being executed on a lessee site 26a–26n either independently or in communication with another site. Initially however, the Original Program $\pi$ resides at the vendor site 14 and the vendor desires to allow one or more lessee sites 26a–26n to have authorized use of the Original Program upon certain terms and conditions. In order to ensure that the lessee does not exceed these terms and conditions, the vendor "transforms" the Original Program $\pi$ into the Vendor Server Program A, the Local Program $\hat{\pi}_1$ and the Excised Program portion $\hat{\pi}_2$ and provides the lessee with access to only the Local Program $\hat{\pi}_1$. The Local Program $\hat{\pi}_1$ performs at least some of the computation associated with the Original Program. However, without access to at least the results provided by execution of the Program $\hat{\pi}_2$ by the Vendor Server Program A, the Local Program lacks functionality of the Original Program, as will be described.

In step 58, a transformation "C" is applied to the Original Program $\pi$ in order to create the Vendor Server Program A, the Program $\hat{\pi}_1$ and the Programr $\hat{\pi}_2$. It is the Local Program $\hat{\pi}_1$ that is downloaded from the vendor site 14 to the one or more lessee sites 26a–26n for local execution at the lessee sites, while the Program $\hat{\pi}_2$ is stored at the vendor site 14 for use or execution by the Vendor Server Program A at the vendor site 14. Thus, Program $\hat{\pi}_2$ is not provided to the lessee sites 26a–26n. The transformation C may be performed in response to loading the Original Program code on the vendor site 14. Alternatively, the transformation C may be performed in response to a request for use of the Original Program $\pi$ transmitted by one or more lessee sites 26a–26n and received at vendor site 14. It will be appreciated by those of ordinary skill in the art that the Program $\hat{\pi}_1$ may be provided to the lessee sites 26a–26n by means other than being downloaded over the network 20. For example, the Program $\hat{\pi}_1$ may be in the form of a "shrink wrapped" software product provided to the lessees.

The transformation C performed on the Original Program $\pi$ can take various forms, as will be described further in conjunction with FIG. 3 below. At a minimum, the transformation C includes the extraction of at least one portion of the Original Program $\pi$ in order to generate the Local Program $\hat{\pi}_1$ which thus lacks the functionality of the extracted portion. The transformation C further includes placement of the extracted portion or at least the functionality of the extracted portion into the corresponding Excised Program Portion $\hat{\pi}_2$. It will be appreciated by those of ordinary skill in the art that code extraction encompasses actual extraction or an equivalent. For example, a portion of the Original Program code could be encrypted and the encrypted version left in the program upon the generation of the Local Program. Additionally, the transformation C may include adding code to the Original Program $\pi$ in order to generate the Local Program $\hat{\pi}_1$ and/or modifying at least a portion of the Original Program code based on a some function in order to generate the Local Program $\hat{\pi}_1$. In one embodiment, it is preferable to extract portions of the code necessary for operation of the Original Program $\pi$.

The extracted portion of code can be characterized as "necessary" in the sense that, in its absence, the Local Program $\hat{\pi}_1$ lacks at least some of the functionality of the Original Program $\pi$. The portion of the Original Program code that is extracted can be selected based on various criteria. For example, program variables and/or statements which are influenced by a particular input, or set of inputs, can be selected for removal, as described in conjunction with the embodiment of FIG. 4. Alternatively, the execution paths of the Original Program $\pi$ can be traced and one or more such paths selected for removal, such as on the basis of path length and/or the number of inputs influencing the path, for example.

Preferably, the portion of code selected to be removed from the Original Program $\pi$ in generating the Local Program $\hat{\pi}_1$ will render it difficult to recreate the functionality of the Original Program $\pi$ from information to which the lessee has access. More particularly, even if an unauthorized user is able to read and modify the code of the Local Program $\hat{\pi}_1$, repeatedly execute the Local Program $\hat{\pi}_1$ in communication with the Vendor Server Program A executing the corresponding Excised Program Portion $\hat{\pi}_2$, and access some details of the transformation C (e.g., with the exception of some random seed given as input to the transformation processor), it should be at least financially infeasible, and preferably also computationally infeasible, to recreate the functionality of the Original Program $\pi$. That is, the cost of reverse-engineering the functionality of the Original Program should approach or exceed the cost of purchasing the program or the expected financial gain from reverse-engineering.

Other considerations in determining the portion of the Original Program code to be extracted are the amount of communication between the Vendor Server Program A and the lessee sites 26a–26n necessary to provide the lessee with the functionality of the Original program $\pi$ and the speed of the network 20. Generally, if the network 20 is relatively slow, relatively little communication should be required between the vendor site 14 and the lessee site in order to prevent performance degradation at the lessee site. However, a balance is required between the level of security provided and any execution delays since, in some cases, the less communication required, the easier it would be for an adversary to reverse-engineer the functionality of the Original Program $\pi$.

Preferably, the execution time of Local Program $\hat{\pi}_1$ is not substantially slower than the execution time of the Original Program $\pi$ and the Vendor Server Program A supplies to Local Program $\hat{\pi}_1$ a relatively small percentage of the total functionality of the Original Program $\pi$. Thus, as long as there are no significant delays in communication between the vendor site 14 and the lessee sites 26a–26n, the latencies involved in executing the distributed program ($\hat{\pi}_1$, A) will be similar to those of executing the Local Program $\hat{\pi}_1$ and hence, to those of Original Program $\pi$.

In the illustrative embodiment, application of the transformation C to the Original Program $\pi$ results in the concurrent generation of the Vendor Server Program A Program $\hat{\pi}_1$, and Program $\hat{\pi}_2$ at the vendor site 14. Alternatively however, the Program A may be generated with or without knowledge of the transform C by a person, such as a software developer.

The Vendor Server Program A may include various degrees of functionality. At a minimum however, the Vendor Server Program A is suitable for utilizing the Excised Program Portion $\hat{\pi}_2$ and for communicating with the Local Program $\hat{\pi}_1$ executing at one or more lessee sites 26a–26n. For example, in one embodiment, Vendor Server Program A executes the Excised Program Portion $\hat{\pi}_2$.

The Vendor Server Program A may additionally include lessee tracking functionality and additional security mechanisms. More particularly, the Vendor Server Program A may monitor the use of one or more lessee sites 26a–26n of the leased Local Program $\hat{\pi}_1$ in order to ensure that the agreed upon terms and conditions are not exceeded. Further, the Program A may implement certain "rules" which control access of the lessee sites 26a–26n to the necessary information required to obtain the functionality of the Original Program $\pi$, as will be described.

The Vendor Server Program A may be compiled along with the Excised Program Portion $\hat{\pi}_2$ and thus, be specific to a particular lessee site. Alternatively, the Vendor Server Program A may be "universal" in the sense that it is suitable for use with different Excised Program Portions $\hat{\pi}_2$ associated with different lessee sites 26a–26n. Alternatively still, the Vendor Server Program A may be "generic" in the sense that it is generated in response to more than one different Original Program.

The Vendor Server Program A is executed by the CPU 16 at the vendor site 14 in conjunction with execution of the Local Program $\hat{\pi}_1$ at one or more of the lessee sites 26a–26n. The Vendor Server Program A communicates with the lessee sites 26a–26n to supply the functionality necessary to provide the lessee with the total functionality of the Original Program $\pi$. The combination of the Vendor Server Program A and the Local Program $\hat{\pi}_1$ may be characterized as a distributed program ($\hat{\pi}_1$, A) since, both programs in communication, yields the equivalent functionality of the Original Program $\pi$. In one embodiment, the Vendor Server Program A acts as an oracle program providing information to Local Program $\hat{\pi}_1$ in response to information requests generated by Local Program $\hat{\pi}_1$ and communicated to Vendor Server Program A.

In step 62, the Local Program $\hat{\pi}_1$ is transferred to one or more lessee sites 26a–26n for execution, or storage and subsequent execution. This transfer occurs in response to a request by the lessee sites for access to a particular application program $\pi$ residing at the vendor site 14. In step 66, the Program Portion $\hat{\pi}_2$ is stored in memory 18 at the vendor site Referring also to FIG. 3, a block diagram illustrating creation of the secure software system is shown in conjunction with lessee sites 26a–26n in communication with the vendor site 14 via the network 20. Some or all of the communication software and hardware may be provided by the processing platforms at the vendor and lessee sites 14, 26. At the vendor site 14, the Original Program $\pi$ is processed by a transformation processor 74 which performs the transformation C on the program 70. The transformation processor 74 may be responsive to transformation instructions 68 containing instructions regarding the particular transformation C and a random seed generator 72 for providing a random set of bits for use in performing the transformation C. The transformation processor 74 may generate the Vendor Server Program A, as noted above. In this regard, the transformation processor 74 may be referred to as an application generator.

The transformation processor 74 includes a code extraction processor 76 which operates to extract at least a portion of the Original Program $\pi$ in order to generate a Local Program $\hat{\pi}_{1a}$–$\hat{\pi}_{1n}$ for each of the lessee sites 26a–26n, respectively. In the illustrative embodiment, the Local Programs $\hat{\pi}_{1a}$–$\hat{\pi}_{1n}$ are coupled to the respective lessee sites 26a–26n via the Vendor Server Program A and respective communication paths 80a–80n of the network 20, as shown. Alternatively however, the Local Programs $\hat{\pi}_{1a}$–$\hat{\pi}_{1n}$ may be coupled directly from the transformation processor 74 to the lessee sites 26a–26n. That is, while the Vendor Server Program A manages the communication between the Local Program and the Excised Program Portions during operation, but may or may not manage transmission of the Local Programs to the lessee sites.

The code extraction processor 76 further generates Program Portions $\hat{\pi}_{2a}$–$\hat{\pi}_{2n}$ with each of the Program Portions $\hat{\pi}_{2a}$–$\hat{\pi}_{2n}$ including the portion of the Original Program code extracted in order to generate the respective Local Program. The Program Portions $\hat{\pi}_{2a}$–$\hat{\pi}_{2n}$ are coupled to the Vendor Server Program A 82 via respective communication paths 84a–84n, as shown. Thus, following the creation of the secure software system, each lessee site 26a–26n has a respective Local Program $\hat{\pi}_{1a}$–$\hat{\pi}_{1n}$ residing thereon and the Vendor Server Program A 82 has access to the corresponding Program Portions $\hat{\pi}_{2a}$–$\hat{\pi}_{2n}$.

The Local Programs $\hat{\pi}_{1a}$–$\hat{\pi}_{1n}$ generated by the code extraction processor 76 for each lessee site 26a–26n may or may not lack the same excised portion of the Original Program. Preferably, there will be at least some distinction between the different Local Programs $\hat{\pi}_{1a}$–$\hat{\pi}_{1n}$ and thus, also the respective Program Portions $\hat{\pi}_{2a}$–$\hat{\pi}_{2n}$ in order to enable the vendor to monitor program usage by each lessee.

The transformation processor 74 may optionally include a code modification processor 78. Processor 78 generates and adds additional code to the Original Program $\pi$ and/or modifies the code of the Original program $\pi$ for further processing by the code extraction processor 76. Modification of the Original program $\pi$ may include a predetermined or mapping process as specified by transformation instructions 68 or a random mapping process in response to input from the random seed from generator 72, as examples. With this arrangement, the code extraction processor 76 is responsive either to the Original Program $\pi$ or to some modified version, or versions thereof as processed by the optional processor 78.

Use of the processor 78 to add to, or otherwise modify, the Original Program code serves to further render it difficult for adversaries to recreate the functionality of the Original Program $\pi$ from the Local Program $\hat{\pi}_1$. Stated differently, the extent of the transformation C should be tailored to the efforts an adversary is likely to invest in reverse-engineering the software.

Figure 3:
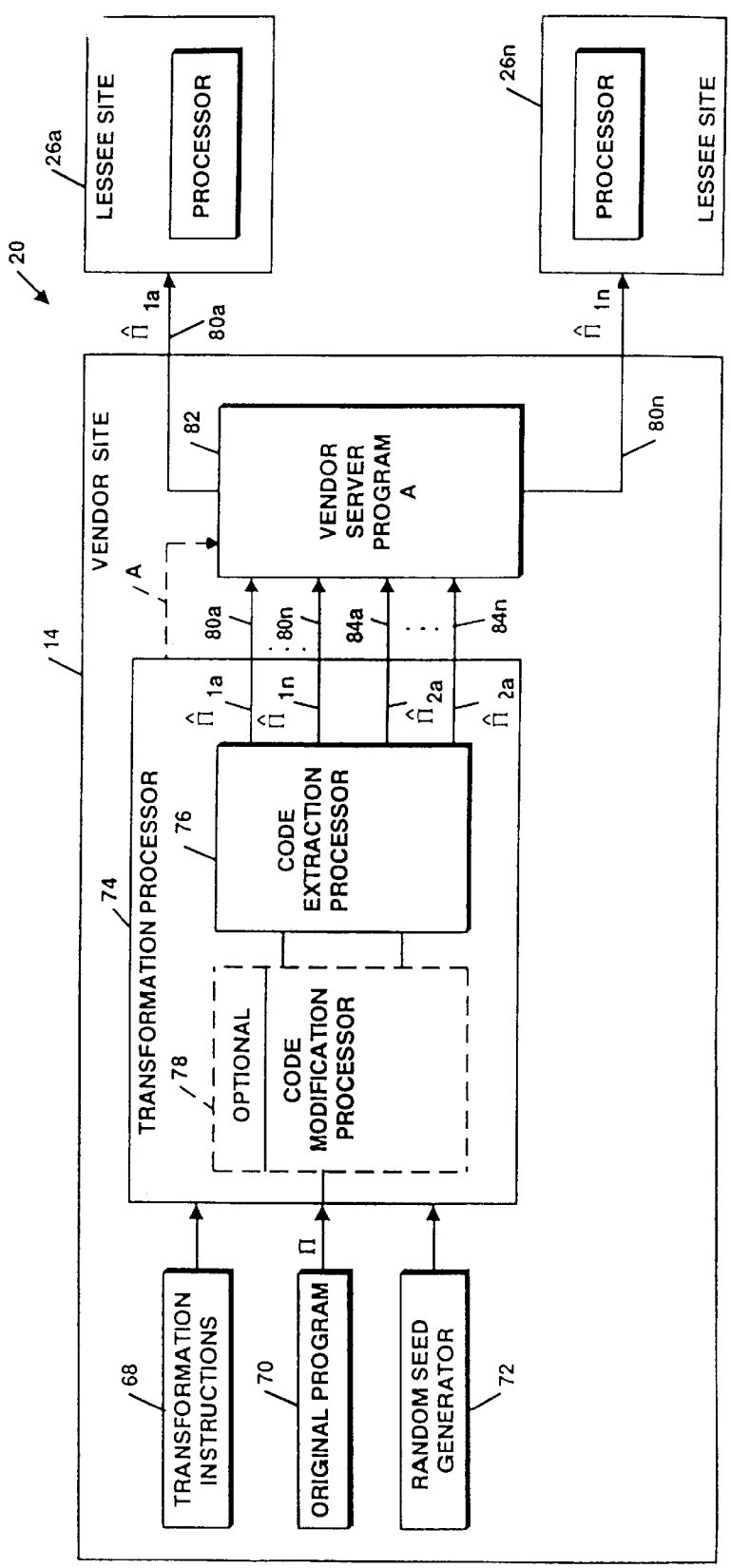
FIG. 3 is a block diagram illustrating creation of a secure software system in accordance with the invention.

Referring also to FIG. 3A, use of the established secure software system will be described. Note that FIG. 3A differs from FIG. 3 in that the communication paths 80a–80n from the code extraction processor 76 to the Vendor Server Program A and further to the lessee sites 26a–26n are removed since, following establishment of the system, a Local Program $\hat{\pi}_{1a}$–$\hat{\pi}_{1n}$ resides at each lessee site 26a–26n. Also removed from FIG. 3A are the communication paths 84a–84n since the Vendor Server Program A no longer requires communication with transformation processor 74. Likewise, Original Program $\pi$ need not be provided to transformation processor 74 after processor 74 provides Programs $\hat{\pi}_{1a}$–$\hat{\pi}_{1n}$ and the respective Excised Program Portions $\hat{\pi}_{2a}$–$\hat{\pi}_{2n}$. Further, FIG. 3A includes communication paths 86a–86n between the Vendor Server Program A and each of the lessee sites 26a–26n for permitting communication between the Local Programs $\hat{\pi}_{1a}$–$\hat{\pi}_{1n}$ and the respective Excised Program Portions $\hat{\pi}_{2a}$–$\hat{\pi}_{2n}$ via the Vendor Server Program 82.

More particularly, the Local Programs $\hat{\pi}_{1a}$–$\hat{\pi}_{1n}$ include or have access to means for communicating with the Vendor Server Program A 82 such that, during execution of the Local Programs at lessee sites 26, if information is required from the Vendor Server Program A 82, such information can be generated by the Vendor Server Program A executing or otherwise interacting with the respective one of the Excised Program Portions $\hat{\pi}_{2a}$–$\hat{\pi}_{2n}$. For example, when lessee site 26a runs Local Program $\hat{\pi}_{1a}$, Local Program $\hat{\pi}_{1a}$ queries Vendor Server Program A for information. Vendor Server Program A generates such information in response to queries generated by Local Program $\hat{\pi}_{1a}$. by executing or otherwise interacting with Program Portion $\hat{\pi}_{2a}$. With this arrangement, the functionality of the Original program $\pi$ is achieved at each lessee site 26a–26n by the combination of execution of the Local Program $\hat{\pi}_{1a}$–$\hat{\pi}_{1n}$ at the lessee site, execution of the Program Portions $\hat{\pi}_{2a}$–$\hat{\pi}_{2n}$ by the Vendor Server Program A, and communication therebetween.

It will be appreciated by those of ordinary skill in the art that the relative timing of execution of the Local Program $\pi_{1a}$ at the lessee site 26a and the execution of the corresponding Program Portions $\pi_{2a}$ by the Vendor Server Program A can be varied. For example, in one embodiment, the Vendor Server Program A executes the Program Portion $\pi_{2a}$ in response to receipt of a query from the corresponding lessee site 26a.

Figure 4:
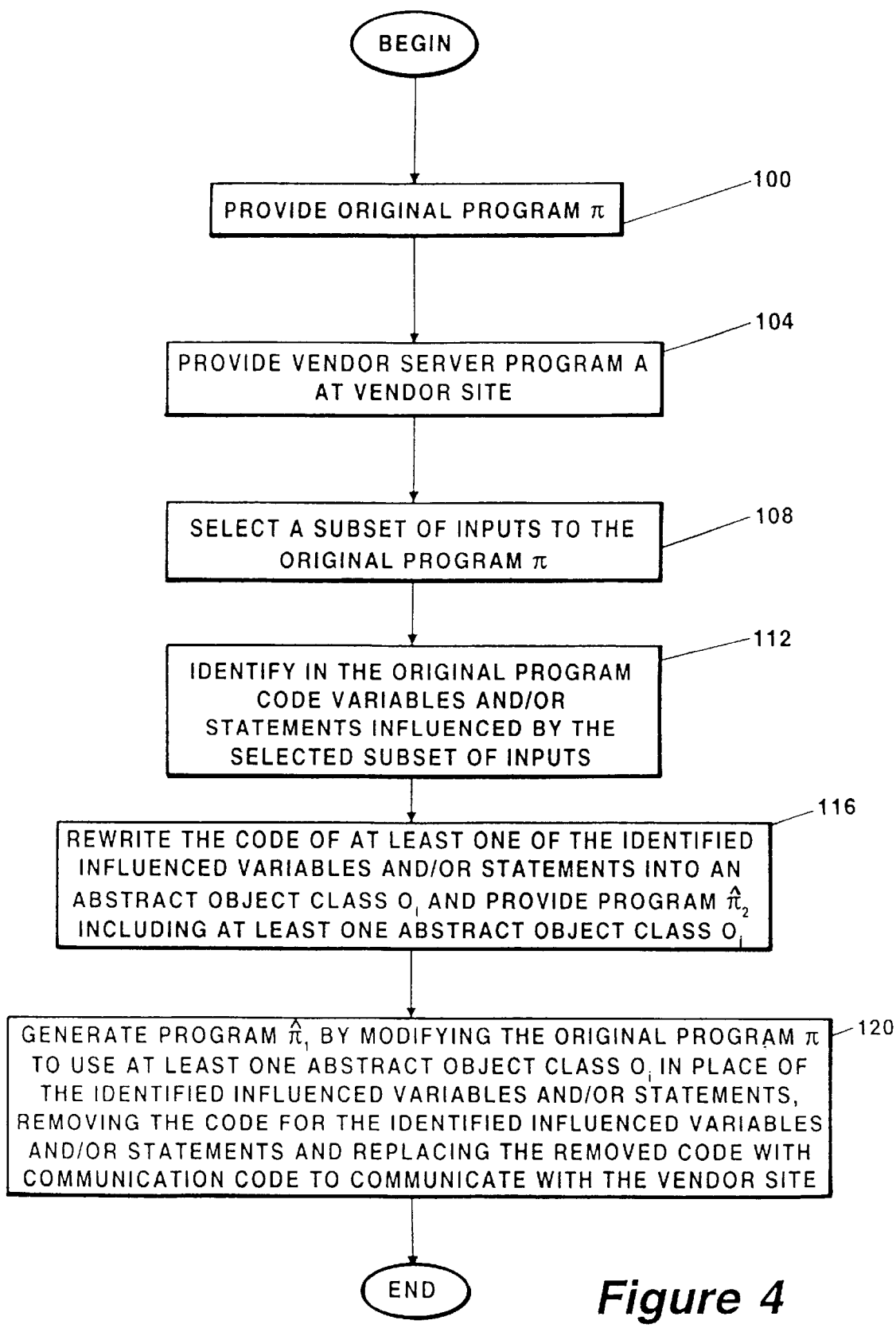
FIG. 4 is a flow diagram illustrating one embodiment for providing the secure software system of FIG. 3.
Figure 5:
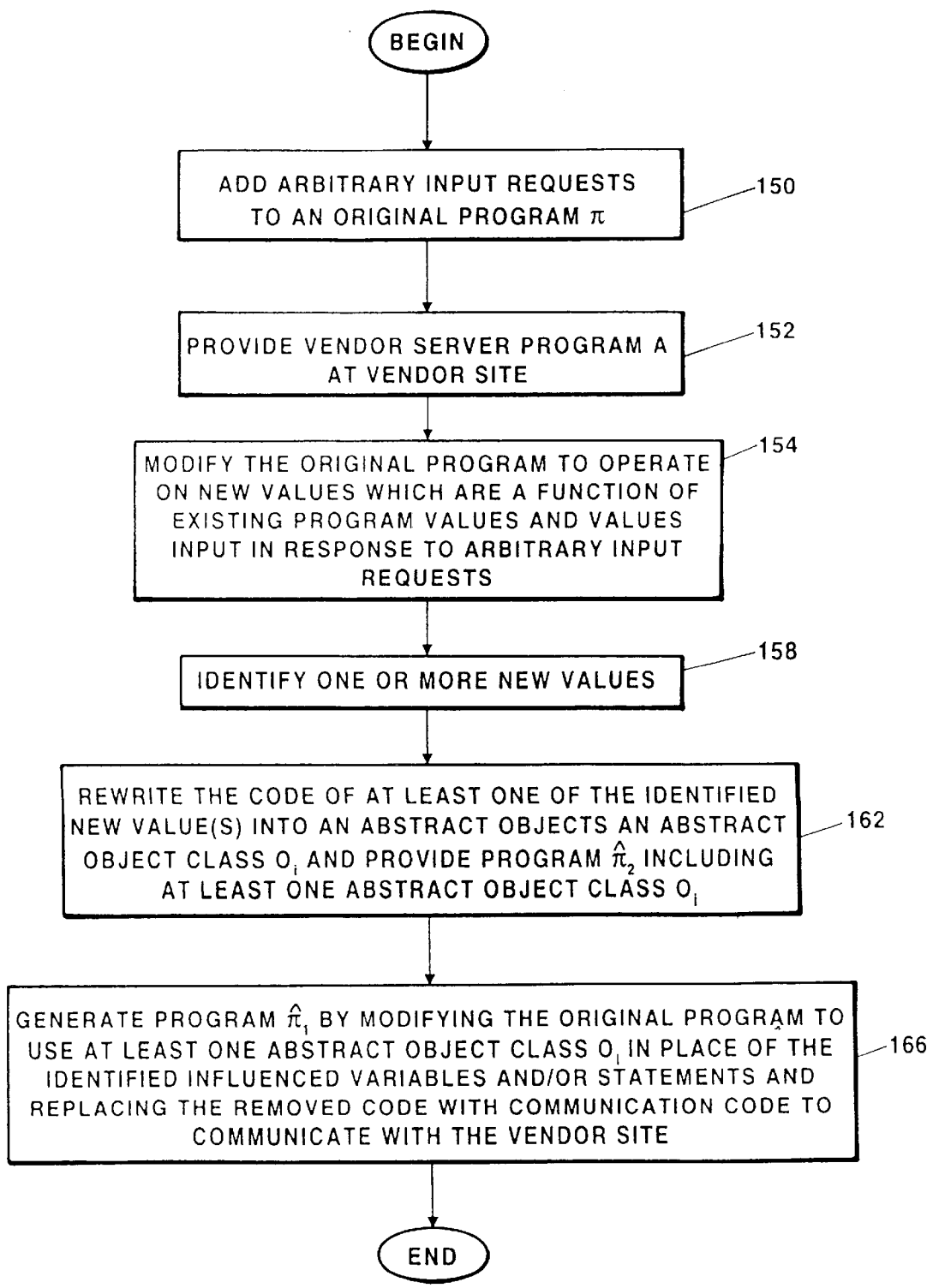
FIG. 5 is a flow diagram illustrating an alternate embodiment for providing the secure software system of FIG. 3.
Figure 6:
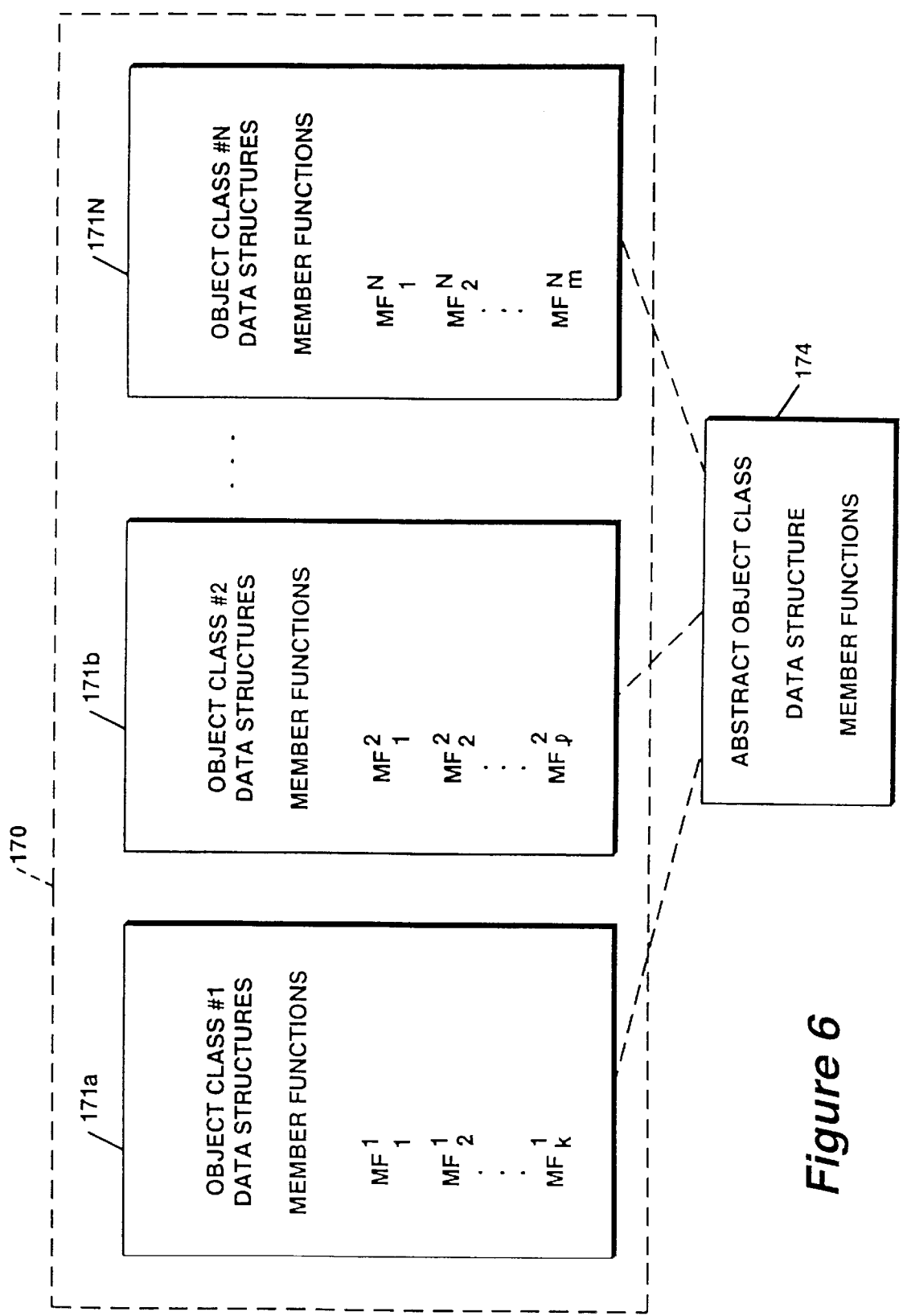
FIG. 6 illustrates the structure of an exemplary abstract object class formed in the methods of FIGS. 4 and 5.

Before proceeding with a discussion of FIGS. 4–6, certain terminology is explained. The Vendor Server Program A, the Local Program $\pi_1$, and the Excised Program Portion(s) $\pi_2$ of the present invention may be implemented using "object-oriented" computer programming techniques. Object-oriented computer programming techniques involve the definition, creation, use and destruction of software entities referred to as "objects." Each object is an independent software entity comprised of data generally referred to as "attributes" and software routines generally referred to as "member functions" or "methods" which manipulate the data.

One characteristic of an object is that only methods of that object can change the data contained in the object. The term "encapsulation" describes the concept of packaging the data and methods together in an object. Objects are thus said to encapsulate or hide the data and methods included as part of the object. Encapsulation protects an object's data from arbitrary and unintended use by other objects and therefore prevents an object's data from corruption.

To write an object-oriented computer program, a computer programmer conceives and writes computer code which defines a set of "object classes" or more simply "classes." Each of these classes serves as a template which defines a data structure for holding the attributes and program instructions which perform the method of an object. Each class also includes a means for instantiating or creating an object from the class template. The means for creating is a method referred to as a "constructor." Similarly, each class also includes a means for destroying an object once it has been instantiated. The means for destroying is a method referred to as a "destructor."

An abstract object class refers to any incomplete class that cannot therefore be used to instantiate semantically meaningful objects. An abstract class is used as a base class to provide common features, provide a minimum protocol for polymorphic substitution or declare missing common features that its derived class must supply prior to instantiation of an object.

When a processor of a computer executes an object-oriented computer program, the processor generates objects from the class information using the constructor methods. During program execution, one object is constructed, which object may then construct other objects which may, in turn, construct other objects. Thus, a collection of objects which are constructed from one or more classes form the executing computer program.

Inheritance refers to a characteristic of object oriented programming techniques which allows software developers to re-use preexisting computer code for classes. The inheritance characteristic allows software developers to avoid writing computer code from scratch. Rather, through inheritance, software developers can derive so-called sub-classes from a base class. The subclasses inherit behaviors from base classes. The software developer can then customize the data attributes and methods of the subclasses to meet particular needs.

With a base-class/sub-class relationship, a first method having a particular name may be implemented in the base-class and a second different method with the same name may be implemented differently in the sub-class. When the program is executing, the first or second method may be called by means of a statement having a parameter which represents an object. The particular method which is called depends upon whether the object was created from the class or the sub-class. This concept is referred to as polymorphism.

For example, assume a computer program includes a class called Employee. Further assume that class Employee includes a member function which defines a series of method steps to be carried out when a worker retires from the company. In an object-oriented implementation, the retire method is automatically inherited by sub-classes of class Employee. Thus, if a class called Executive is a sub-class of the class called Employee, then class Executive automatically inherits the retire method which is a member function of the class Employee.

A company or organization, however, may have different methods for retiring an employee who is an executive and an employee who is not an executive. In this case, the sub-class Executive could include its own retire method which is performed when retiring an employee who is an executive. In this situation, the method for retiring executive employees contained in the Executive class overrides the method for retiring employees in general contained in the Employee class. With this base class/sub-class arrangement another object may include a method which invokes a retirement method. The actual retirement method which is invoked depends upon the object type used in the latter call. If an Executive object type is used in the call, the overriding retirement method is used. Otherwise, the retirement method in the base-class is used. The example is polymorphic because the retire operation has a different method of implementation depending upon whether the object used in the call is created from the Employee class or the Executive class and this is not determined until the program runs.

Since the implementation and manner in which data attributes and member functions within an object are hidden, a method call can be made without knowing which particular method should be invoked. Polymorphism thus extends the concept of encapsulation.

Object-oriented computer programming techniques allow computer programs to be constructed of objects that have a specified behavior. Several different objects can be combined in a particular manner to construct a computer program which performs a particular function or provides a particular result. Each of the objects can be built out of other objects that, in turn, can be built out of other objects. This resembles complex machinery being built out of assemblies, subassemblies and so on.

For example, a circuit designer would not design and fabricate a video cassette recorder (VCR) transistor by transistor. Rather, the circuit designer would use circuit components such as amplifiers, active filters and the like, each of which may contain hundreds or thousands of transistors. Each circuit component can be analogized to an object which performs a specific operation. Each circuit component has specific structural and functional characteristics and communicates with other circuit components in a particular manner. The circuit designer uses a bill of materials which lists each of the different types of circuit components which must be assembled to provide the VCR. Similarly, computer programs can be assembled from different types of objects each having specific structural and functional characteristics.

The term "client object," or more simply "client," refers to any object that uses the resources of another object which is typically referred to as the "server object" or "server." The term "framework" can refer to a collection of inter-related classes that can provide a set of services (e.g., services for network communication) for a particular type of application program. Alternatively, a framework can refer to a set of interrelated classes that provide a set of services for a wide variety of application programs (e.g., foundation class libraries for providing a graphical user interface for a Windows system). A framework thus provides a plurality of individual classes and mechanisms which clients can use or adapt.

An application framework refers to a set of classes which are typically compiled, linked and loaded with one particular application program and which are used by the particular application program to implement certain functions in the particular application program. A system framework, on the other hand, is provided as part of a computer operating system program. Thus, a system framework is not compiled, linked and loaded with one particular application program. Rather, a system framework provides a set of classes which are available to every application program being executed by the computer system which interacts with the computer operating system.

Referring now to FIG. 4, an illustrative embodiment for establishing the software security system will be described in conjunction with generating exemplary Program Portion $\hat{\pi}_{2a}$ and the corresponding Local Program $\hat{\pi}_{1a}$ for execution at lessee site 26a. In this example, the optional code addition and modification processor 78 is not operative. It will be appreciated by those of ordinary skill in the art that the particular sequence of steps described is illustrative only and can be varied.

Processing commences in step 100, with the Original Program π being provided at the vendor site 14. In this embodiment, the Original program π is dependent on at least one input. The Vendor Server Program A is provided at the vendor site 14 in step 104, as described above in conjunction with step 58 of FIG. 2.

In step 108, a subset of the program inputs is selected in accordance with a predetermined criteria. For example, a random subset of the program inputs may be selected in accordance with a random seed provided by generator 72 (FIGS. 3 and 3A). As another example, the program code may be traced into paths and the selected subset of inputs may be those which affect a particular one or more paths, such as the longest or shortest path or the path having the most or least input dependencies.

Once the subset of program inputs is selected, the variables and/or statements in the Original Program code which are influenced by the selected subset of inputs are identified in step 112. A variable or statement is influenced by an input if changing the input changes the value stored in the variable or the outcome of executing the statement.

In step 116, the program code associated with at least one of the influenced variables and/or statements is rewritten into a corresponding abstract object class $O_i$. Thus, where a plurality of the influenced variables and/or statements are rewritten, the result is the set of one or more abstract object classes $\{O_1, \ldots, O_k\}$. This step can be achieved using standard object-oriented programming techniques that can be applied to any program code. If the programming language in which the Original Program is written does not allow such a modification, then the Original Program can be converted to a language that does such modification.

Also in step 116, the Program Portion $\hat{\pi}_{2a}$ is generated and includes at least one of the abstract object classes $\{O_1, \ldots, O_k\}$. The abstract object class, or classes provided in the Excised Program Portion are selected in accordance with the desired level of difficulty in recreating the functionality of the Original Program π. That is, a proper choice of the variables and/or statements or class member functions to be included in one or more abstract object classes and provided in the Excised Program Portion can make determining the functionality of the remotely executed object(s) infeasible to an adversary.

In step 120, the Local Program $\hat{\pi}_{1a}$ is generated by modifying the Original Program π to use the at least one abstract object class $\{O_1, \ldots, O_k\}$ included in the Excised Program Portion $\hat{\pi}_{2a}$ in place of at least one of the identified influenced variables and/or statements, removing the code for the identified influenced variables and/or statements and replacing the removed code with communication code to permit communication to the vendor site 14. The communication code may take various forms. For example, one or more queries, or Request Messages, can be embedded into the Local Program $\hat{\pi}_{1a}$ which require responses, or Reply Messages, from the Vendor Server Program A for successful execution.

The Vendor Server Program A may include certain "rules" that will render it difficult to determine the behavior of Program Portion $\hat{\pi}_{2a}$ and thus, to replicate, a particular abstract object class included in Program Portion $\hat{\pi}_{2a}$ simply by repeatedly sending Request Messages and analyzing the resulting Reply Messages. For example, the Vendor Server Program A may include rules which ensure that Request Messages from the Local Program are answered only if the order of the Request Messages corresponds to a predetermined valid order. As another example, the Vendor Server Program A may require that the lessee site 26a–26n "prove" that it has authorization to run the Local Program $\hat{\pi}_{1a}$ prior to responding to any Request Messages. For example, a password scheme might be used in order to prevent unauthorized use of the software by certain users, such as children, even at an authorized lessee site. Alternatively, a digital ID based on public key cryptography scheme could be implemented where a dynamic challenge identification test would be based on messages exchanged between Program $\hat{\pi}_1$ and Program A. Other techniques could also be used.

In one particular embodiment, the Local Program $\hat{\pi}_1$ and the Vendor Server Program A are implemented using object-oriented programming techniques to ensure that each. program's execution is a sequence of operations on abstract object classes. Each object's state consists of a collection of memory locations and there is a set of operations that are the only means of manipulating the object's state. Each operation $OP_i$ on an object $O_i$ has corresponding inputs and outputs. The relation between the Local Program and the Vendor Server Program A is thus that for some subset $\{O_1, \ldots, O_k\}$ of the objects in the Local Program $\hat{\pi}_{1a}$, the memory addresses and code for executing the operations on the objects are missing. The code and memory locations are part of the Vendor Server Program A. That is, one or more abstract objects are removed from the Original Program to generate the Local Program in the sense that the code associated with the object is removed and the memory locations associated with that object at run time are on the vendor site 14.

The complete distributed program $(\hat{\pi}_1, A)$, in its simplest form, has the lessee locally execute the Local Program $\hat{\pi}_{1a}$. Every operation $OP_i$ on an object $O_i$ that is missing from the Local Program, is replaced by a Request Message ($OP_i$, inputs) sent by the Local Program $\hat{\pi}_{1a}$ from the lessee site 26a to the vendor 14. The Vendor Server Program A receives Request Message ($OP_i$, inputs), runs the procedure corresponding to the operation $OP_i$ with inputs on object $O_i$ which is part of the corresponding Program Portion $\hat{\pi}_{2a}$, and sends a Reply Message ($OP_i$, outputs) with the outputs being the results returned by the object $O_i$.

Referring to the flow diagram of FIG. 5, the secure software system is also suitable for securing an Original Program that is not input dependent. In this case, additional process steps are provided in order to effectively convert the program into an input dependent Original Program. To this end, processing commences in step 150, in which one or more Arbitrary Input Requests are inserted into the Original Program. In step 152, the Vendor Server Program A is provided at the vendor site 14, as described above.

In step 154, the program code is modified to operate on values, referred to as New Values, which are a function of existing program values and values input in response to the one or more Arbitrary Input Requests. In step 158, at least one of the New Values is identified for generating a corresponding abstract object class $O_i$ and in step 162, the code associated with the identified New Values is rewritten into the corresponding abstract object class $\{O_1-O_k\}$. The Program Portion $\hat{\pi}_{2a}$ is generated in step 162 by forming a program containing at least one abstract object class from the set of generated abstract object classes $\{O_1-O_k\}$.

The corresponding Local Program $\hat{\pi}_{1a}$ is generated in step 166 by modifying the Original Program to use at least one abstract object class $\{O_1, \ldots, O_k\}$ comprising the Program Portion $\hat{\pi}_{2a}$ in place of the identified New Values, removing the code for the identified New Values and replacing the removed code with communication code to permit communication with the vendor site 14 as discussed above in conjunction with step 120 of FIG. 4.

It will be appreciated by those of ordinary skill in the art that the process described in conjunction with FIG. 5 of inserting arbitrary input requests and modifying the program to operate on New Values associated with such requests may be implemented even on an original program which is dependent on one or more inputs. Such an insertion of additional input dependencies may provide a useful additional safety measure against unauthorized program use in certain applications.

Referring also to FIG. 6, an object-oriented computer program 170 includes a plurality of object classes 171a–171N. Each of the object classes 171a–171N may include one or more data structure definitions and/or one or more member functions $MF_1-MF_i$, $MF_1-MF_j$ and $MF_1-MF_m$, respectively. To secure the computer program 170, one or more of the data structure definitions or the member functions are excised from the computer program 170 and included as part of an abstract object class 174. The abstract object class 174 is utilized by a server program of the type described above in conjunction with FIGS. 3 and 3A.

By removing portions of the code from object classes 171, computer program 170 is unable to function in its intended manner. The code removed from the object classes 171 is replaced by code which enables the program 170 to communicate with the server program. Thus, computer program 170 is effectively transformed, by the removal (or an equivalent function thereof) and addition of certain computer code into a lessee program.

The resultant lessee program may be transmitted over a communication path and stored at a lessee site for execution by a processor at the lessee site. Upon execution of the lessee program at the lessee site, the lessee program communicates with the Vendor Server Program via any conventional communication technique. For example, lessee program may communicate with the Vendor Server Program via using a remote procedure call or a message passing technique.

Considering, for example, a 3-D rendering/modelling program of the type used by architects and engineers. Such programs are relatively complex, computationally intensive, and are relatively expensive to purchase. Due at least in part to the relatively high price of such programs, many architectural and engineering firms do not purchase the programs when they are required only for specific projects. One way to make the program available to potential users is to lease the program to the users on a temporary basis, with costs that do not introduce a significant startup overhead.

Because of the computational intensity, 3-D rendering programs are designed for use on the client's machine. Even with improved network bandwidth and latency, supporting the concurrent execution of multiple copies of such a program off a remote server would require a significant investment in hardware and support on the part of the program vendor.

One solution to such a problem, as described above in conjunction with FIGS. 1–6, is to allow the users to run the program on their local machines, but maintain control over how long and by whom the program is used. This is accomplished by transforming the original program as described above.

A first alternative transform includes the removal of predefined program code lines or objects. In this approach, the program developer inserts markers in the program specifying which sets of operations/memory locations are hardest to determine from the program $\hat{\pi}_1$. These operations/memory locations are thus good candidates for removal.

A second alternative transform includes removal of entire objects. Removing an object means removal of the code and the actual memory locations associated with the object and at run time allocating those variables on the server machine running Program A. If necessary, Program A will retain these allocated memory locations from one execution of the specific subprogram $\hat{\pi}_2$ to the next until the lessee terminates the lease/rental of the program (and possibly even after that following special request). In this example, such data could be some crucial subset of information about the details of the design of buildings being rendered. For example, a set of objects that are called infrequently and that are influenced by the inputs can be selected for removal of their entire functionality. In this approach, each object class in the program has a set of operations ml . . . mk that are the means of invoking operations on an object O instantiated from the object class. A table of all sets of operations and the inputs that influence them should be established. All objects can be examined and a subset can be randomly selected.

Figure 7:
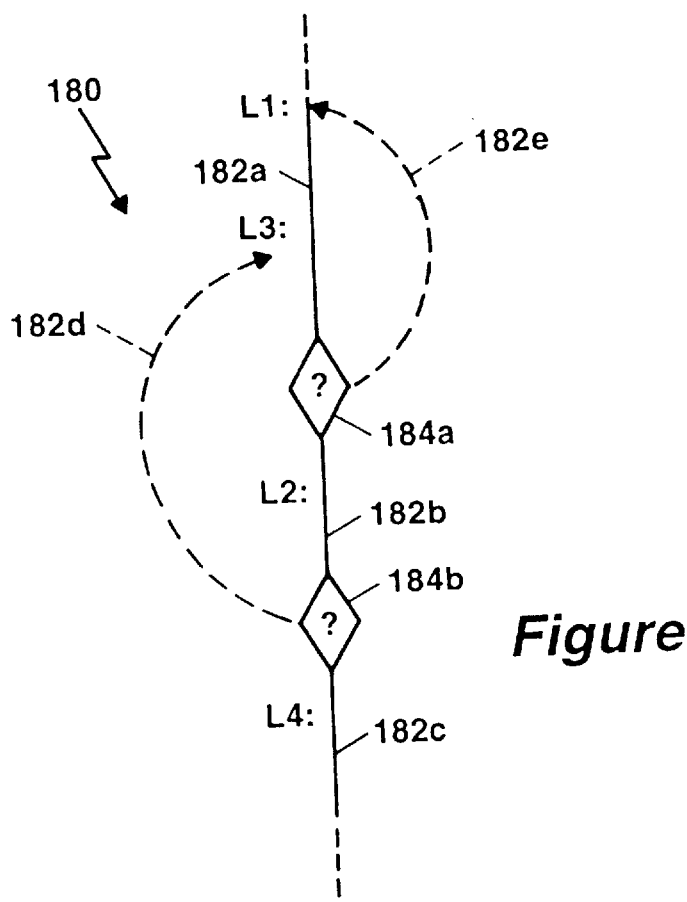
FIG. 7 illustrates a graph of a sequential program code fragment.
Figure 7A:
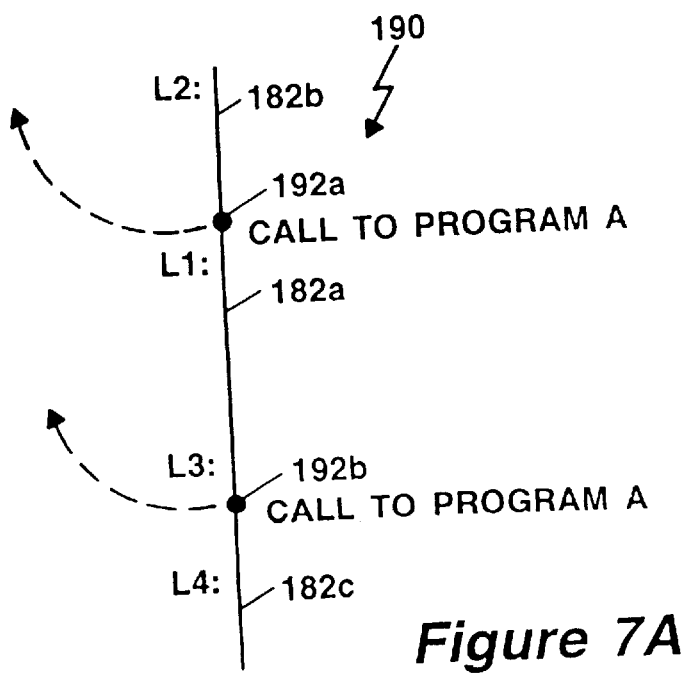
FIG. 7A illustrates a graph of a non-sequential program code fragment.

Referring now to FIGS. 7 and 7A, a particular example of yet another technique for transforming program code is shown. An original program $\pi$ written in a high level language such as C or C++ is compiled or otherwise processed to provide a series of sequential code statements. Most programs can be transformed into such a representation. A fragment of program code from such a series of sequential statements is shown in Table 1.

TABLE 1

| | |
|---|---|
| L1: | x: = y + 2z; |
| | z: = sqrt (w + x)/2; |
| | y: = y + 1; |
| L3: | read(z); |
| C1: | if(x + y) = z mod w then go to L1; else go to L2; |
| L2: | x: = y + z; |
| | z: = 2y; |
| C2: | if (w/2 < 5) then go to L3; |
| L4: | |

In the case of an object-oriented program, all objects and object calls are unwrapped to provide such a sequence of code statements. The fragment of program code in Table 1 can be diagrammatically illustrated as a graph 180 shown in FIG. 7. Graph 180 includes a plurality of edges 182a–182e which represent variables/statements in the code fragment shown in Table 1. Graph 180 also includes condition nodes 184a, 184b which represent condition statements labelled as C1, C2 in the code fragment of Table 1. The resulting code is thus a collection of sequences of operations on variables (edges) 182a–182e each ending on a conditional branch instructions (nodes) 184a, 184b. The edge-node pairs are sequenced in a particular order.

In the above-described 3-D program, for example, depending on inputs defining the dimensions of the rendered buildings and computer screen size, one would need to have a sequence of instructions for scaling images and branch instructions based on tests that evaluate how to best apply the sequences to scale displayed 3-D objects for viewing.

Next, a processor generates a table of the conditional branch tests and the variables/instructions upon which the branch tests depend. One can also include (based on analyzing the original high level object oriented code) per each such test a list of objects/operations that influence these variables as described above in conjunction with the second transform alternative.

Considering the program code in terms of the graph shown in FIG. 7, the edges 182a–182e are laid out sequentially in memory in some order (i.e., the program is a sequence of instructions stored one after the other on a diskette or in a region of computer memory).

Next, the order in which the edges are laid out may be permuted to provide graph 190 as shown in FIG. 7A. As pictorially illustrated in graph 190, the order of the edges 182a–182c has been changed from the original order illustrated in graph 180 (FIG. 7). Additionally the conditional nodes 184a, 184b have been removed and replaced by program call nodes 192a, 192b.

A mixed order graph 190 may be generated by selecting a random set (or possibly the most influenced set in terms of number of affected objects/operations to the number of inputs influencing the variable that the branch depends on) of conditional branch tests and their related code from $\hat{\pi}_1$ (one can actually remove complete sequences of operations on the related high level object in which each chosen branch occurs) and replacing the selected conditional branch tests and related code from $\hat{\pi}_1$ with calls to a new remote object in the program $\hat{\pi}_2$. The remote object in program $\hat{\pi}_2$ will, among other things, return the location in the code from which one must continue. This removal effectively means that complete sections of the code are scattered in arbitrary places in the sequential program description and there is no information available regarding the continuation of a given sequence of to instructions which exists in the code. In order to determine such information, one must receive the response to the appropriate call to the program A which will run the missing test relating to that conditional branch operation and return the location in the program from which to continue. In a complicated program it would be relatively difficult to determine the function provide by the program A since it would be necessary for a user at the lessee site to obtain large numbers of responses to each removed branch condition. Furthermore, the user at the lessee site would have to try large number of inputs to insure that all conditional branch instructions were in fact investigated.

Permuting the program code fragment presented in Table 1 in the above described manner can result in the permuted program code fragment shown in Table 2.

TABLE 2

| | |
|---|---|
| | x: = y + z; |
| | z: = 2y; |
| A1: | v: = call ('line 285', x, y, z, w); |
| | go to v; |
| L1: | x: = y + 2z; |
| | z: = sqrt (w + x)/2; |
| | y: = y + 1; |
| L3: | read (z); |
| A2: | v: = call ('line 291', x, y, z, w); |
| | go to v; |

As can be seen from Table 2, the conditional statements C1, C2 in the program code fragment of Table 1 have been replaced by call statements A1, A2 and corresponding "goto" statements in the program code of Table 2. In the call statements, values of variables x, y, z, w are provided to program A and program A returns the location of a particular line of code which should next be executed in Program $\hat{\pi}_1$. Thus, the "goto" statements replace the test conditions of conditional statements C1, C2 (Table 2) and the call statements A1, A2 provided the next executable line of program code. Also, the optional step of hashing the code fragments has been implemented on the code fragments. That is, the order in which the code fragments appear in Table 1 is different than the order in Table 2. In this manner, the program $\hat{\pi}_1$ can be prevented from executing properly without input from Program A.

Selecting only a subset of the conditional branch instructions to replace with "go to" statement and hashing code fragments to remove sequentiality of the program code renders it relatively difficult to replace the functionality provided by Program A. In other embodiments, blank condition statements and corresponding "go to" statements can be inserted into the program.

Note that there is an interesting tradeoff, the larger and more complicated the program, the more it is worthwhile to break it, but at the same time, it is more likely to have a relatively large number of conditional branch operations and thus the transformations will be harder to reverse engineer.

In all of the above transformations it is possible to include in the code the digital-id/public-key cryptographic protocols to support correct identification of users so that each program copy can be executed only by its authorized lessee. Thus identification can be done dynamically by requiring, for example, that the lessees dynamically sign the messages sent to A. It should also be noted that in some applications it may be desirable to utilize a different variation of the above transformations per individual user. The tradeoff with such an approach is the cost of such an approach with respect to the need to generate additional copies of the code.

The above transformations can be used in combination to make the effort and hence the cost of determining the missing functionality relatively high. On the other hand, most of the computation of π is performed by the lessee in $\pi_1$.

Having described the preferred embodiments of the invention, it will now become apparent to one of skill in the art that other embodiments incorporating their concepts may be used. It is felt therefore that these embodiments should not be limited to disclosed embodiments but rather should be limited only by the spirit and scope of the appended claims.

What is claimed is:

1. A processing system for executing an original computer program with a first portion of the original computer program executing in a first processor located at a first processing site and a second portion of the original computer program executing in a second different processor located at a second different processing site wherein the first and second processing sites are physically separate and adapted to communicate over a network, the second processor at the second processing site comprising:

(a) a code extraction processor to receive the original computer program and to parse the original computer program to provide a first program for execution at the first processing site and an associated second program for execution at the second processing site, wherein said code extraction processor provides the second program such that the second program does not by itself constitute an executable computer program and wherein the second program includes portions of the original computer program selected to render it difficult to re-create the functionality of the original computer program from information stored at or otherwise available at the first processing site;

(b) a storage device having stored therein a server program which utilizes the second program and wherein in response to communications provided thereto by the first program executing at the first processing site, the server program provides information over the network to the first processing site which allows the first program executing at the first processing site to re-create the functionality of the original computer program at the first processing site; and (c) an execution processor to execute the server program and the second program at the second processing site; and (d) a plurality of communication paths, each of the communication paths coupled between a particular one of the plurality of first processing sites and the particular server program utilizing the associated second program portion and wherein the server program manages the communication between the first program and the second program associated with the particular first program during execution of the first program; and wherein said code extraction processor processes the original computer program to extract a plurality of different second programs from the original computer program to provide a like plurality of different first programs with each of the plurality of first programs intended to be transmitted to a different one of a plurality of first processing sites and each of the second program portions intended to be utilized by the server program and executed by the execution processor at the second processing site and wherein said code extraction processor concurrently generates one or more first programs, one or more second programs and one or more server programs and each of the one or more server programs utilizes a respective one of the one or more second programs and each of the one or more second programs is associated with a corresponding one of the one or more first programs and includes one or more portions of the original computer program wherein the one or more portions are selected to render it difficult to recreate the functionality of the original computer program from information stored at or otherwise available at the first processing site and each of the plurality of first programs generated by said code extraction processor for execution at first processing sites requires a different input which is provided from the respective one of the one or more server programs utilizing the associated second programs and executing at the second processing site.

2. The system of claim 1 wherein said means for selecting a subset of inputs further comprises means for randomly selecting first ones of a plurality of inputs to the original software program.

3. A method for securing an original software program comprising a plurality of statements and being responsive to at least one input, said method comprising the steps of:

(a) selecting a subset of the at least one input;

(b) identifying ones of the plurality of statements which are influenced by said selected subset of the at least one input;

(c) defining at least one abstract object class;

(d) including at least one of the identified statements in each of the at least one abstract object classes;

(e) generating a program portion which utilizes each of the at least one abstract object classes;

(f) removing said identified statements from said software program to provide a lessee software program; and (g) inserting program code into the lessee software program which allows the lessee software program to communicate with said program portion over a network.

4. The method of claim 3 further comprising the step of:

transmitting the lessee software program to a lessee site; and storing the lessee software program in a storage device at the lessee site.

5. The method of claim 4 further comprising the step of:

including each of the at least one abstract classes in a program accessible by the program portion; and storing the program portion in a storage device at a vendor site.

6. The method of claim 5 further comprising the step of storing the each of the at least one abstract object classes in a storage device at the vendor site.

7. The method of claim 6 further comprising the step of storing the program which includes the abstract object class in a storage device at the vendor site.

8. A secure software system comprising:

(a) a first processing site including:

a code extraction processor to receive an original software program and to parse the original software program to provide a first program and a second program wherein said code extraction processor further comprises: means for selecting a subset of inputs of the original software program; and means for identifying statements of the original software program which are influenced by the inputs selected by said means for selecting;

a first storage device having the first program stored therein;

a second storage device having stored therein a server program which utilizes the first program;

an execution processor, coupled to said first and second storage devices, to execute the second program generated by the transformation processor and the server program; and means for transmitting and receiving information over a network;

(b) a second processing site including:

a first storage device having the first program stored therein; and a processor for executing the first program generated by said code extraction processor;

means for transmitting and receiving information over a network; and (c) a network, coupled between said first site and said second site for providing a communication channel between the server program and the first program.

9. The system of claim 8 wherein said means for selecting a subset of inputs further comprises means for randomly selecting first ones of a plurality of inputs to the original software program.

10. The system of claim 8 wherein said means for selecting a subset of inputs further comprises:

means for identifying a plurality of execution paths in the original software program;

means for identifying at least one input in each of the execution paths of the original software program; and means for selecting predetermined ones of the inputs to the original software program in accordance with a predetermined criteria.

11. The system of claim 8 wherein said first site further comprises a code modification processor coupled to the input of said code extraction processor for receiving the original software program and for modifying program code of the original software program and for providing a modified original software program to said code extraction processor.

12. A processing system for executing an original software program, the processing system comprising:

(a) a first processor located at the first processing site, to execute a first program which corresponds to a first portion of an original software program;

(b) a second processor located at the second processing site which is physically separated from the first processing site, the second processor for executing a second program which corresponds to a second portion of the original software program where the first and second programs combined correspond to the entire original software program;

(c) a communications network coupled between the first and second processing sites and through which said first processor communicates with said second processor; and means for transmitting information between said first processor and said second processor over said communications network wherein in response to the first program receiving a first set of inputs, the first program generates a first set of communications and provides the first set of communications across said communications network to the second program and the second program provides a corresponding first set of communications to the first program over said communications network.

13. The system of claim 12 wherein in response to the first program receiving a second set of inputs, the first program generates a second set of communications and provides the second set of communications to the second program and wherein the second program provides a corresponding second set of communications to the first program over said communications network.

14. The system of claim 13 wherein the first set of communications generated by the first program relate to at least one of: (a) a first set of variables; (b) a first set of statements; and (c) a first execution path which have been removed from the first program and which are influenced by the first set of inputs.

15. The system of claim 14 wherein the second set of communications generated by the first program relate to at least one of: (a) a second set of variables; (b) a second set of statements; and (c) a second execution path which have been removed from the first program and which are influenced by the second set of inputs.

16. The system of claim 13 wherein the second processing site is adapted to halt the execution of the first program by not supplying the corresponding set of first or second communications to the first program.

17. A processing system for executing an original software program, the processing system comprising:

(a) a first processor located at the first processing site, to execute a first program which corresponds to a first portion of an original software program;

(b) a second processor located at the second processing site which is physically separated from the first processing site, the second processor for executing a second program which corresponds to a second portion of the original software program where the first and second programs combined correspond to the entire original software program;

(c) a communications network coupled between the first and second processing sites and through which said first processor communicates with said second processor; and means for transmitting information between said first processor and said second processor over said communications network; and (d) a code extraction processor to receive the original software program and to parse the original software program to provide the first program and the second program.

18. The system of claim 17 wherein said code extraction processor further comprises:

means for selecting a subset of inputs of the original software program; and means for identifying statements of the original software program which are influenced by the inputs selected by said means for selecting.

19. The system of claim 18 wherein said means for selecting a subset of inputs further comprises means for selecting first ones of a plurality of inputs to the original software program which allow the program executing in said processor at the second processing site to maintain control over the first program executing at the processor at the first processing site.

20. A processing system for executing an original software program, the processing system comprising:

(a) a first processor located at the first processing site, to execute a first program which corresponds to a first portion of an original software program, said first processor having a bus operating at a first bus speed;

(b) a second processor located at the second processing site which is physically separated from the first processing site, the second processor for executing a second program which corresponds to a second portion of the original software program where the first and second programs combined correspond to the entire original software program, said first processor having a bus operating at a second bus speed;

(c) a communications network coupled between the first and second processing sites and through which said first processor communicates with said second processor, said communications network operating at a third speed wherein the third speed is slower than the speed at which the fist and second buses operate; and (d) means for transmitting information between said first processor and said second processor over said communications network;

wherein communication between the first program and the second program across said communications network is input dependent; and wherein in response to the first program receiving a first set of inputs, the first program generates a first set of communication across said communication network to the second program and wherein the second program provides a corresponding first set of communications to the first program over the communications network.

21. The system of claim 20 wherein in response to the first program receiving a second set of inputs, the first program generates a second set of communication and provides the second set of communications to the second program and wherein the second program provides a corresponding second set of communications to the first program over said communications network.

22. The system of claim 21 wherein the first set of communications generated by the first program relate to at least one of: (a) a first set of variables; (b) a first set of statements; and (c) a first execution path which have been removed from the first program and which are influenced by the first set of inputs.

23. The system of claim 22 wherein the second set of communications generated by the first program relate to at least one of: (a) a second set of variables; (b) a second set of statements; and (c) a second execution path which have been removed from the first program and which are influenced by the second set of inputs.

24. The system of claim 20 wherein the second processing site is adapted to halt the execution of the first program by not supplying one of the corresponding set of first and second communications to the first porgram.

25. A processing for executing an original software program, the processing system comprising:

(a) a first processor located at the first processing site, to execute a first program which corresponds to a first portion of an original software program, said first processor having a bus operating at a first bus speed;

(b) a second processor located at the second processing site which is physically separated from the first processing site, the second processor for executing a second program which corresponds to a second portion of the original software program where the first and second programs combined correspond to the entire original software program, said first processor having a bus operating at a second bus speed;

(c) a communications network coupled between the first and second processing sites and through which said first processor communicates with said second processor, said communications network operating at a third speed wherein the third speed is slower than the speed at which the fist and second buses operate;

(a) means for transmitting information between said first processor and said second processor over said communications network; and (e) a code extraction processor to receive the original software program and to parse the original software program to provide the first program and the second program, wherein said code extraction processor further comprises:

means for selecting a subset of inputs of the original software program; and means for identifying statements of the original software program which are influenced by the inputs selected by said means for selecting.

26. The system of claim 25 wherein said means for selecting a subset of inputs further comprises means for selecting first ones of a plurality of inputs to the original software program which allow the program executing in said processor at the second processing site to maintain control over the first program executing at the processor at the first processing site.

27. A method for securing an original program that is dependent on one or more inputs, the method comprising the steps of:

(a) adding an arbitrary input request to the original program;

(b) modifying the original program to operate on new values which are a function of existing program values and values input in response to the arbitrary input request;

(c) identifying one or more new values;

(d) rewriting code of the original program which utilizes identified new values;

(e) removing the implementation code of some or all of the rewritten code;

(f) replacing the removed code by a set of communication calls to a vendor server program; and (g) inserting program code into the vendor server program such that the vendor server program utilizes the implementation code removed in step (d);

(f) adding a communication interface to the vendor server program.

* * * * *

UNITED STATES PATENT AND TRADEMARK OFFICE
CERTIFICATE OF CORRECTION

PATENT NO. : 6,304,972 B1
DATED : October 16, 2001
INVENTOR(S) : Nir N. Shavit

It is certified that error appears in the above-identified patent and that said Letters Patent is hereby corrected as shown below:

Column 5,
Line 46, delete "on a some" and replace with -- on some --.

Column 7,
Line 26, delete "site" and replace with -- site. --.

Column 15,
Line 65, delete "win," and replace with -- will, --.

Column 16,
Line 5, delete "provide by" and replace with -- provided by --.
Line 36, delete "provided the" and replace with -- provide the --.

Column 21,
Line 10, delete "fist" and replace with -- first --.

Column 22,
Line 11, delete "fist" and replace with -- first --.
Line 12, delete "(a)" and replace with -- (d) --.

Signed and Sealed this

Fourth Day of June, 2002

Attest:

JAMES E. ROGAN
*Attesting Officer*     *Director of the United States Patent and Trademark Office*